(12) United States Patent  
Maruyama et al.

(10) Patent No.: US 7,920,359 B2
(45) Date of Patent: Apr. 5, 2011

(54) MAGNETIC RECORDING APPARATUS WITH CORRELATED MAIN MAGNETIC POLE-TO-SHIELDS SPACING AND MAIN MAGNETIC POLE-TO-MEDIUM LAYERS SPACING

(75) Inventors: Yohji Maruyama, Saitama (JP); Nelson Cheng, Fremont, CA (US); Hideki Zaitsu, Kanagawa (JP); Hisao Okamoto, Shizuoka (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 512 days.

(21) Appl. No.: 12/012,241

(22) Filed: Jan. 31, 2008

(65) Prior Publication Data

US 2008/0180861 A1 Jul. 31, 2008

(30) Foreign Application Priority Data

Jan. 31, 2007 (JP) ................................. 2007-021550

(51) Int. Cl.
*G11B 5/127* (2006.01)
(52) U.S. Cl. ...................................................... 360/125.3
(58) Field of Classification Search .................... None
See application file for complete search history.

(56) References Cited

U.S. PATENT DOCUMENTS

| | | | |
|---|---|---|---|
| 2004/0212923 A1 | 10/2004 | Taguchi | |
| 2005/0141137 A1* | 6/2005 | Okada et al. | 360/122 |
| 2005/0237665 A1 | 10/2005 | Guan et al. | |
| 2006/0082924 A1 | 4/2006 | Etoh et al. | |
| 2008/0117546 A1* | 5/2008 | Le et al. | 360/125.03 |
| 2008/0180839 A1* | 7/2008 | Mochizuki et al. | 360/125.03 |

* cited by examiner

Primary Examiner — David D Davis
(74) Attorney, Agent, or Firm — Zilka-Kotab, PC

(57) ABSTRACT

Embodiments of the present invention achieve a high linear recording density and a high track recording density to thereby improve the areal recording density in a perpendicular magnetic recording apparatus having a magnetic head that includes a trailing shield and side shields around a main magnetic pole piece. According to one embodiment, in a magnetic recording apparatus, each of magnetic distances of various sorts is set so as to satisfy relationships of $Lmag<T\text{-}Gap$ and $HUS<S\text{-}Gap$, where the magnetic shortest distance between the main magnetic pole piece and a trailing shield is defined as T-Gap; the magnetic shortest distance between the main magnetic pole piece and each of side shields disposed on both sides of the main magnetic pole piece is defined as S-Gap; a distance between a surface of the main magnetic pole piece and a lower surface of a magnetic recording layer constituting a recording medium is defined as Lmag; and a distance between the surface of the main magnetic pole piece and an upper surface of a soft magnetic underlayer of the recording medium is defined as HUS. Further, each of the magnetic distances of various sorts is set so as to satisfy a relationship of $Lmag<T\text{-}Gap<HUS<S\text{-}Gap$.

10 Claims, 9 Drawing Sheets

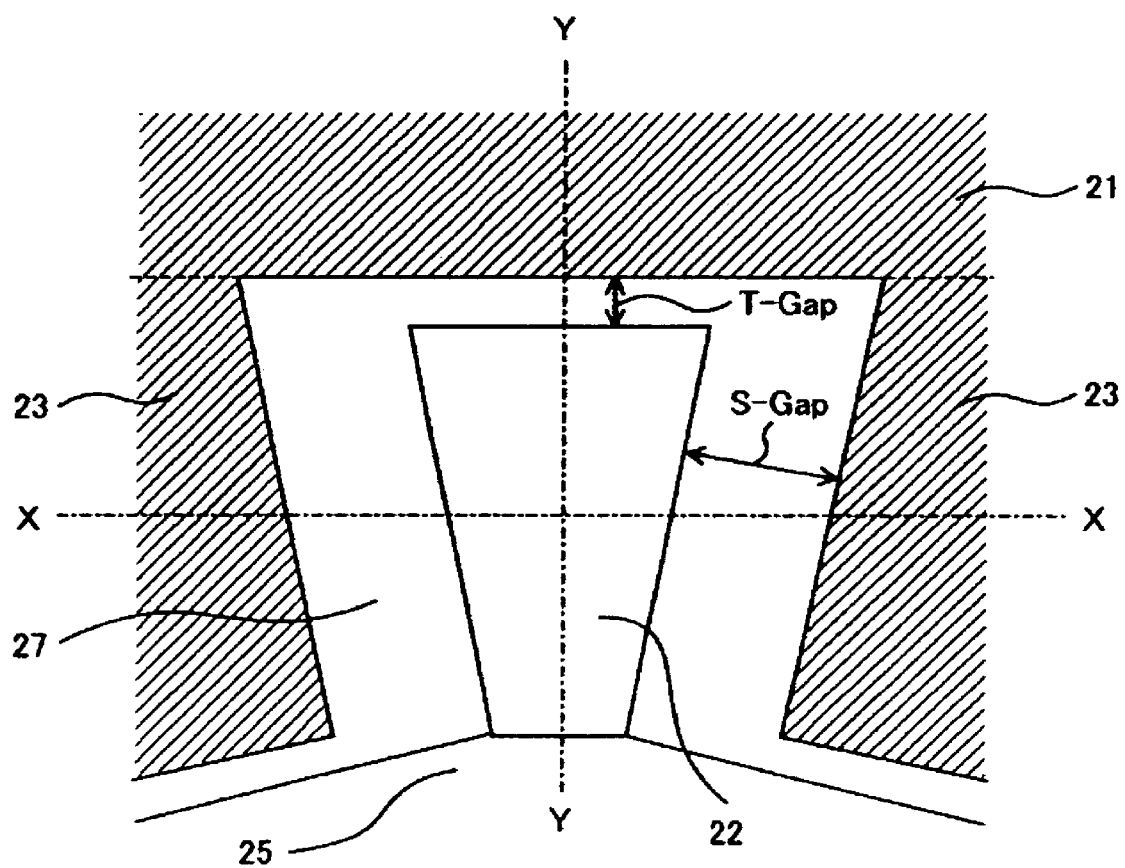

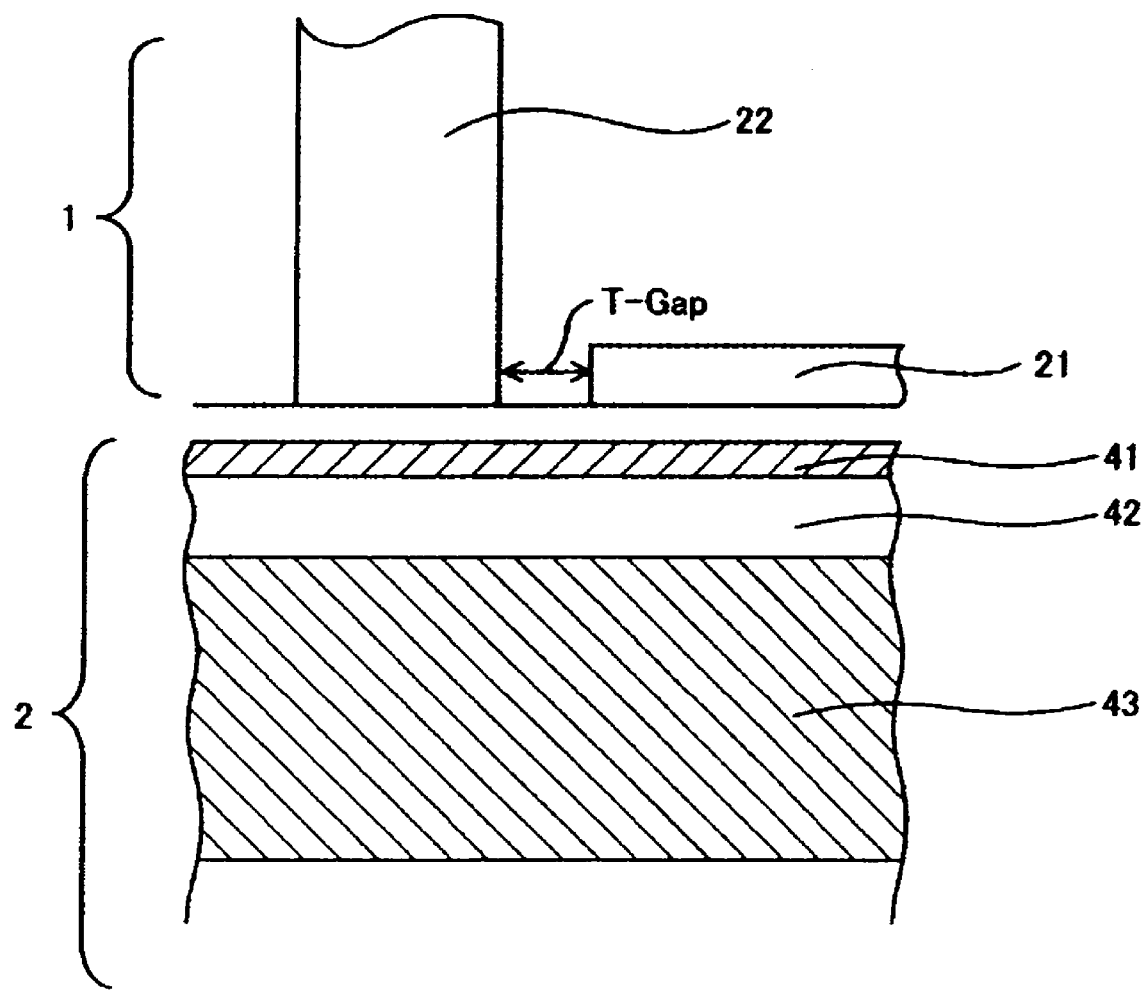

MAGNETIC RECORDING APPARATUS WITH CORRELATED MAIN MAGNETIC POLE-TO-SHIELDS SPACING AND MAIN MAGNETIC POLE-TO-MEDIUM LAYERS SPACING

CROSS-REFERENCE TO RELATED APPLICATION

The instant nonprovisional patent application claims priority to Japanese Patent Application No. 2007-021550 filed Jan. 31, 2007 and which is incorporated by reference in its entirety herein for all purposes.

BACKGROUND OF THE INVENTION

Semiconductor memories and magnetic memories are mainly used for storage (recording) devices of information apparatuses. The semiconductor memories are used for internal storage devices from the viewpoint of access time, while magnetic disk drives are used for external magnetic storage devices from the viewpoint of their large storage capacity and non-volatility. The storage capacity is an index indicating performance of the magnetic disk drive. In line with the recent development in the information society, there is an emerging market need for compact magnetic disk drives offering large storage capacities. Perpendicular recording is suitable for this market need. For its ability to achieve high-density recording, the perpendicular recording system is considered to become the mainstream, supplanting conventional longitudinal recording.

Japanese Patent Publication No. 2006-120223 ("Patent Document 1") and Japanese Patent Publication No. 2005-310363 ("Patent Document 2") disclose magnetic heads for perpendicular recording, in which the shortest distance between a main magnetic pole piece and soft magnetic films disposed on both sides thereof is longer than the shortest distance between the main magnetic pole piece and a soft magnetic film disposed on a trailing side thereof. Japanese Patent Publication No. 2004-326990 ("Patent Document 3") discloses a magnetic head for perpendicular recording, in which the shortest distance between a main magnetic pole piece and an auxiliary magnetic pole piece is one to five times as long as the distance in surface between a soft magnetic film disposed on a lower surface of a recording medium and the main magnetic pole piece.

In magnetic recording media of the perpendicular recording system, magnetization occurs in a direction perpendicular to the surface of the medium. As a result, effect from demagnetizing field acting between adjacent magnetic domains is relatively smaller than the longitudinal recording system. This allows high-density magnetic information to be recorded on the medium, achieving a magnetic disk having a large storage capacity.

To make the most out of this characteristic of the perpendicular magnetic recording medium, there is a shield disposed on the trailing side of the main magnetic pole piece, so that a recording magnetic field has a precipitous magnetic field gradient. In addition, to prevent the recording magnetic field from leaking to adjacent tracks, shields are provided on both sides of the main magnetic pole piece.

A shield structure is embodied in the art disclosed in Patent Document 1 as the magnetic head for perpendicular recording, in which the distance between the main magnetic pole piece and the shield on the trailing side is shorter than the distance between the main magnetic pole piece and the side shield. Similarly, a shield structure is embodied in the art disclosed in Patent Document 2 as the magnetic head for perpendicular recording, in which the distance between the main magnetic pole piece and the shield on the trailing side is shorter than the distance between the main magnetic pole piece and each of the side shields disposed on both sides of the main magnetic pole piece. Meanwhile, Patent Document 3 discloses the magnetic disk drive, in which the distance between the main magnetic pole piece and the auxiliary magnetic pole piece for returning a magnetic flux from the medium is one to five times as long as the shortest distance between the soft magnetic underlayer surface of the magnetic disk and the main magnetic pole piece.

The above-referenced conventional art techniques are considered effective in promoting even higher densities in perpendicular magnetic recording. The conventional art techniques, however, do not mention techniques to optimize the distance between the main magnetic pole piece and side shields, and between the main magnetic pole piece and the trailing shield. There is therefore a problem in that recording densities are not as much improved as expected depending on conditions of the soft magnetic underlayer and perpendicular recording layer that constitute the perpendicular magnetic recording medium.

BRIEF SUMMARY OF THE INVENTION

Embodiments of the present invention achieve a high linear recording density and a high track recording density, to thereby improve the areal recording density in a perpendicular magnetic recording apparatus having a magnetic head that includes a trailing shield and side shields around a main magnetic pole piece.

According to the particular embodiment of FIG. 1B, in a magnetic recording apparatus including shields disposed on a trailing side and both sides of a main magnetic pole piece that records magnetic information, various magnetic distances are set so as to satisfy the relationships of Lmag<T-Gap and HUS<S-Gap, where the magnetic shortest distance between the main magnetic pole piece and a trailing shield is defined as T-Gap; the magnetic shortest distance between the main magnetic pole piece and each of side shields disposed on both sides of the main magnetic pole piece is defined as S-Gap; a distance between a surface of the main magnetic pole piece and a lower surface of a magnetic recording layer constituting a recording medium is defined as Lmag; and a distance between the surface of the main magnetic pole piece and an upper surface of a soft magnetic underlayer of the recording medium is defined as HUS. In a further embodiment, each of the magnetic distances is set so as to satisfy a relationship of Lmag<T-Gap<HUS<S-Gap.

BRIEF DESCRIPTION OF THE DRAWINGS

FIG. 1A is a view showing an area around a main magnetic pole piece of a magnetic head as viewed from an air bearing surface according to a first embodiment of the present invention.

FIG. 1C is a cross-sectional view taken along line Y-Y of FIG. 1A.

DETAILED DESCRIPTION OF THE INVENTION

Embodiments of the present invention relate to a magnetic recording apparatus using perpendicular magnetic recording suitable for recording high-density magnetic information.

It is an object of embodiments of the present invention to achieve high recording densities in a magnetic recording apparatus having a perpendicular magnetic recording medium. Typically, a magnetic recording apparatus according to an aspect of embodiments of the present invention is configured to achieve the foregoing object as follows.

Specifically, the magnetic recording apparatus according to an aspect of embodiments of the present invention includes shields disposed on a trailing side and both sides of a main magnetic pole piece that records magnetic information. In this magnetic recording apparatus, each of magnetic distances of various sorts is set so as to satisfy relationships of Lmag<T-Gap and HUS<S-Gap, where the magnetic shortest distance between the main magnetic pole piece and the trailing shield is defined as T-Gap; the magnetic shortest distance between the main magnetic pole piece and the side shield is defined as S-Gap; a distance between a surface of the main magnetic pole piece and a lower surface of a recording layer constituting a perpendicular magnetic recording medium during a write operation is defined as Lmag; and a distance between the surface of the main magnetic pole piece and an upper surface of a soft magnetic underlayer of the perpendicular magnetic recording medium during the write operation is defined as HUS.

In the magnetic recording apparatus, S-Gap<LSL should be satisfied where a distance between the surface of the main magnetic pole piece and a lower surface of the soft magnetic underlayer during the write operation is defined as LSL.

Additionally, in the magnetic recording apparatus, Lmag<T-Gap<HUS<S-Gap should be satisfied.

Further, in a magnetic recording apparatus having a perpendicular magnetic recording medium and a magnetic head with a main magnetic pole piece, in a relationship between a magnetic recording track width WC defined from a half-value width of an amplitude distribution of an output signal obtained by letting the magnetic head seek in a track width direction through magnetic information recorded on the perpendicular magnetic recording medium at any given fixed frequency by the magnetic head and an error rate BER obtained by writing and reading magnetic information, a change width of dBER/dWC falls within a range of inclination of 0.25 to 0.45 per dWC=10 nm, where an amount of change in the magnetic track width is defined as dWC and an amount of change in the error rate relative to a condition of a recording current supplied to the coil is defined as dBER.

According to the aspect of embodiments of the present invention, a high linear recording density and a high recording track density can be achieved to improve a surface recording density of the magnetic recording apparatus.

Figure 2A:
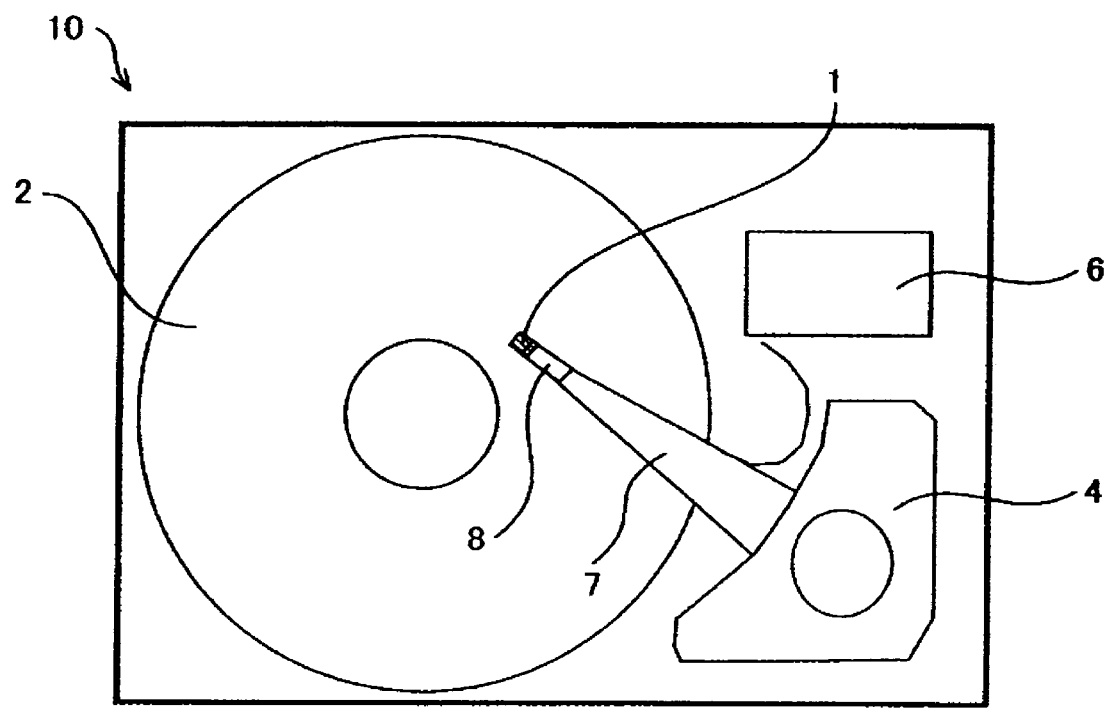
FIGS. 2(a) and 2(b) are views showing a basic configuration of a magnetic recording apparatus according to the first embodiment of the present invention, FIG. 2(a) being a plan view and FIG. 2(b) being a cross-sectional view.
Figure 2B:
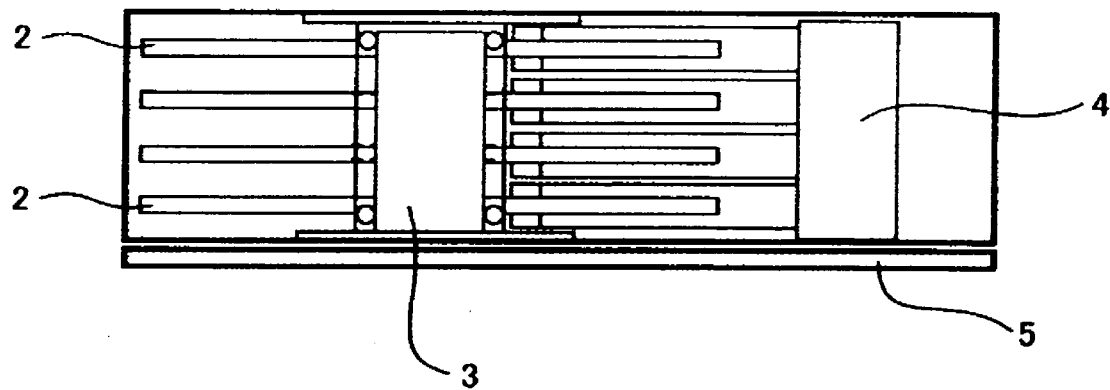

FIGS. 2(a) and 2(b) are views showing a basic configuration of a magnetic recording apparatus (magnetic disk drive) 10 using the perpendicular recording system. FIG. 2(a) is a plan view showing the magnetic recording apparatus 10. FIG. 2(b) is a cross-sectional view showing the magnetic recording apparatus 10. A perpendicular magnetic recording medium (magnetic disk) 2 is directly connected to a spindle motor 3 and rotated during input and output of information. A magnetic head 1 is supported by a suspension 8. The suspension 8 is supported by an actuator 4 by way of an arm 7. The suspension 8 holds the magnetic head 1 above the magnetic disk 2 with a predetermined force. A read/write circuit 6 disposed inside a cabinet of the magnetic disk drive 10 and a signal processing circuit mounted on a circuit board 5 disposed on an outside of the cabinet perform processing of read and write signals and input and output of information. Read waveforms obtained in the perpendicular magnetic recording system (change in amplitude of read signals relative to the time axis) are a trapezoidal wave unlike a Lorentz type waveform as observed in the longitudinal recording system. The signal processing circuit and the waveform equivalent circuit used in the perpendicular recording system are different from those in the longitudinal magnetic recording system.

The perpendicular recording system uses a magnetic disk 2 having an axis of easy magnetization in the direction perpendicular to a recording plane. A glass or Al substrate is used for the substrate. A thin magnetic film constituting a perpendicular magnetic recording layer is formed on the substrate. Recording magnetic fields from the magnetic head 1 act on the magnetic disk 2 to reverse magnetization in the perpendicular magnetic recording layer. The perpendicular magnetic recording needs to use a perpendicular component field in the recording field. For this reason, a soft magnetic underlayer (SUL) is disposed between the perpendicular magnetic recording layer and the substrate.

The magnetic head 1 includes a write element and a read element. The write element has a main magnetic pole piece for recording magnetic information. The read element reads the magnetic information. A read element utilizing magnetoresistive phenomenon, giant magnetoresistive phenomenon, or electromagnetic induction phenomenon, is used for the read element. The write element and the read element are disposed on a slider. The magnetic head 1 disposed on the slider radially moves over the surface of the magnetic disk 2 as the actuator 4 is rotated. The magnetic head 1 is thereby positioned at any given location (track) before reading or writing the magnetic information. An electric circuit controlling the actuator 4 is mounted together with the signal processing circuit on the circuit board 5.

Figure 3:
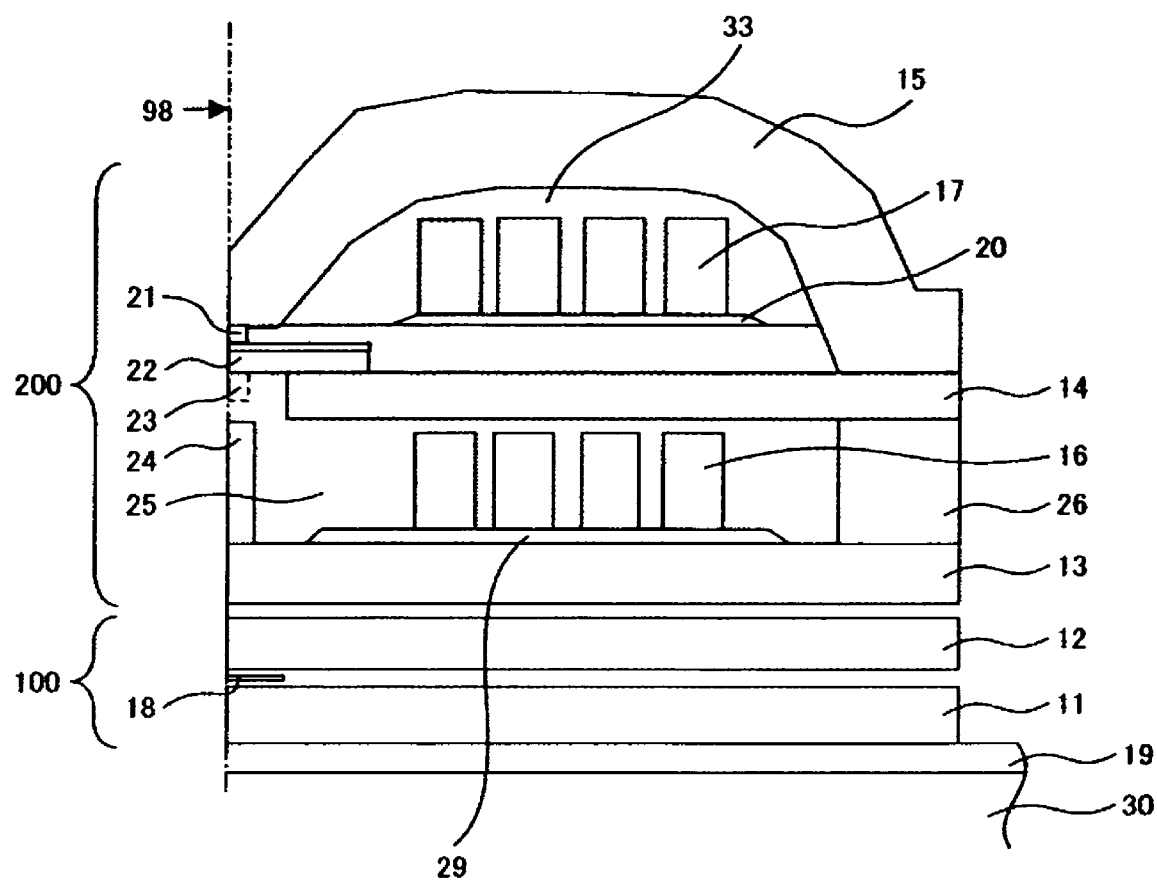
FIG. 3 is a cross-sectional view showing the basic configuration of a magnetic head according to the first embodiment of the present invention.

The basic configuration of the magnetic head 1 will be described below with reference to FIG. 3. FIG. 3 is a cross-sectional view showing a device, taken along a center of a main magnetic pole piece 22 and perpendicular to an air bearing surface 98. The device includes a substrate 30 of a slider member, on which an underlayer 19, a read element 100, and a write element 200 are stacked in that sequence. The read element 100 includes a lower shield 11, an upper shield 12, and a magnetoresistive element 18 surrounded by the upper and lower shields 11, 12 and having a portion exposed to the air bearing surface. An electrode is connected to the magnetoresistive element 18 and electric information from the magnetoresistive element 18 is transmitted the signal processing circuit. For the magnetoresistive element 18, a giant magnetoresistive effect (GMR) element, a GMR element or a TMR element of a CPP (current perpendicular to plane) structure, or the like is used. In the CPP structure, the lower and upper shields 11, 12 may serve also as the electrode. The lower and upper shields 11, 12 each use permalloy composed of NiFe with 80% or more of Ni.

The substrate 30 of the slider member is formed of $Al_2O_3$—TiC (alumina carbide titanate). The lower and upper shields 11, 12, the magnetoresistive element 18, and the like are separated, for example, by $Al_2O_3$ (alumina) or the like as a nonmagnetic and insulative (or extremely highly electrically resistive) material.

The write element 200 basically includes a soft magnetic film pattern (yoke) 14, a magnetic layer 22, a magnetic film 13, a soft magnetic film pattern 26, and a magnetic film 15. The yoke 14 is sandwiched between a lower coil 16 and an upper coil 17. The magnetic layer 22 is connected to the yoke 14 and constitutes the main magnetic pole piece 22 for writing data to a medium. The magnetic film 13 constitutes an auxiliary magnetic pole piece for returning a magnetic flux from the medium (functioning also as a shield for reducing effect from a magnetic field produced by the lower coil 16 on the read element 100). The soft magnetic film pattern 26 and the magnetic film 15 magnetically connect the auxiliary magnetic pole piece 13 and the yoke 14. The magnetic film 15 is structured to be wide on the air bearing surface 98 and thin in a depth direction. This configuration helps reduce a magnetic flux distribution in the magnetic film 15 during recording (a wide area) and a magnetic flux directly leaking from the main magnetic pole piece 22 (a thin structure).

The magnetic layer 22 constituting the main magnetic pole piece for writing data to the medium is exposed to the air bearing surface 98 and defines a recording track width. The main magnetic pole piece 22 includes a trailing shield 21 disposed on a trailing side thereof via an insulating layer, and side shields 23 on both sides thereof via insulating layers. Further, a soft magnetic film pedestal pattern 24 is disposed to be exposed to the air bearing surface 98. The main magnetic pole piece 22 has a rear end connected to the yoke 14 and a rear end of the yoke 14 constitutes a back gap. The magnetic film 15 and the yoke 14 are magnetically coupled by way of the soft magnetic film pattern 26 at the back gap portion.

The upper coil 17 is disposed between the yoke 14 and the magnetic film 15. An insulating layer 20 is disposed between the upper coil 17 and the yoke 14 to ensure electric insulation therebetween. Similarly, an insulating layer 29 is disposed on the underside of the lower coil 16 to ensure electric insulation therebetween. Further, an insulating layer 33 is packed between the upper coil 17 and the magnetic film 15 to ensure electric insulation therebetween. An insulating layer 25 on the underside of the main magnetic pole piece 22 ensures insulation between the lower coil 16 and the yoke 14, for which alumina is used.

First Embodiment

Figure 1B:
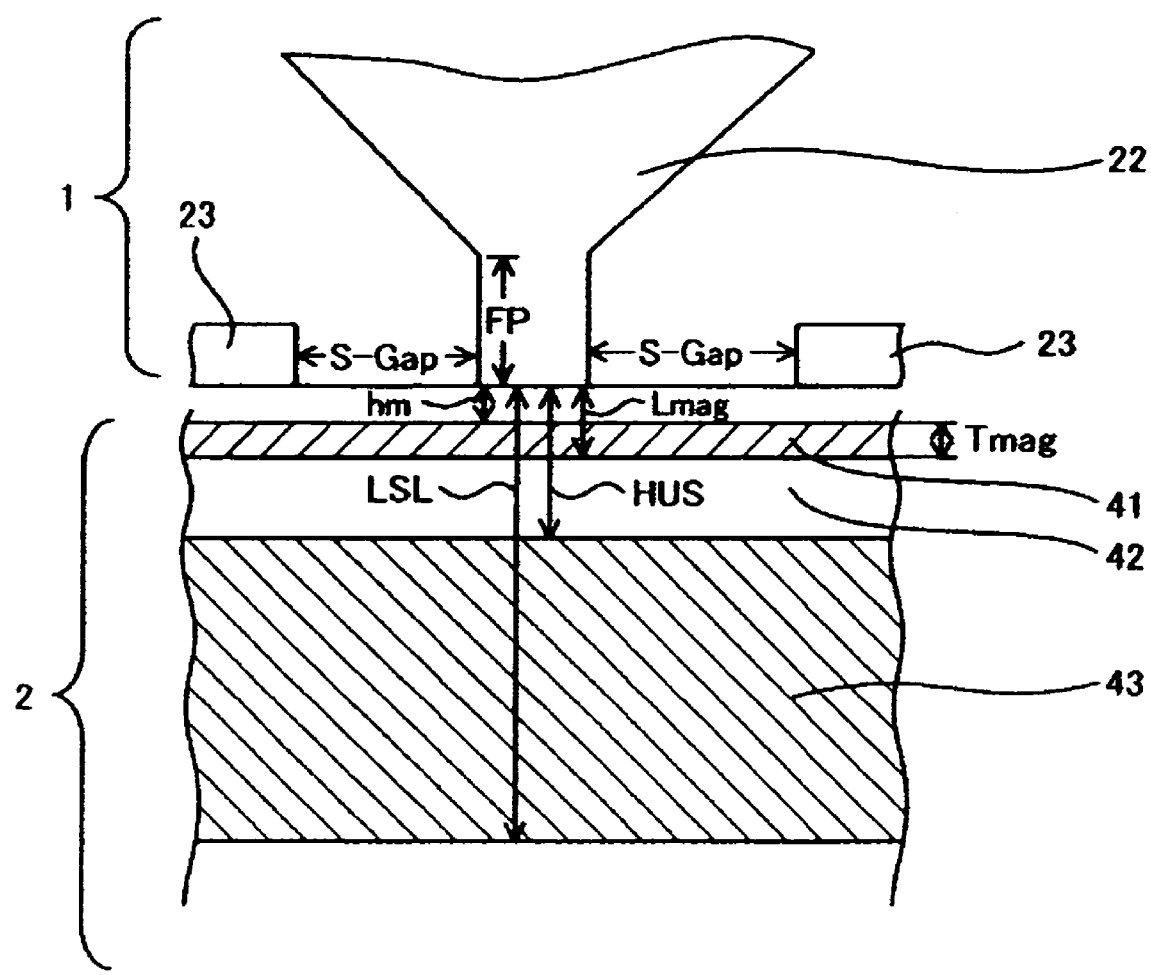
FIG. 1B is a cross-sectional view taken along line X-X of FIG. 1A.

FIGS. 1A through 1C are enlarged views showing the main magnetic pole piece 22 of the magnetic head 1 and portions surrounding the same described earlier with reference to FIG. 3. Aspects of the first embodiment of the present invention will be described with reference to FIGS. 1A through 1C. FIG. 1A is a view showing the shape of the air bearing surface 98 of the main magnetic pole piece 22. FIG. 1B is a cross-sectional view taken along line X-X of FIG. 1A, or a plane passing substantially through a center of film thickness of the main magnetic pole piece 22 and extending perpendicularly to the air bearing surface 98. FIG. 1C is a cross-sectional view taken along line Y-Y of FIG. 1A, or a plane passing substantially through a center of track width of the main magnetic pole piece 22 and extending perpendicularly to the air bearing surface 98. Referring to FIG. 1A, the main magnetic pole piece 22 is an inverted trapezoidal shape in the air bearing surface 98. A recording medium surface of the magnetic disk 2 moves in an upward direction of the paper surface. Referring to FIG. 1B, the main magnetic pole piece 22 has a leading end portion and a flare portion. The leading end portion has a predetermined, constant width in the depth direction, while the flare portion has a width widening in the depth direction. Let the length from the air bearing surface 98 to the flare portion be denoted as flare length FP. The side shields 23 are disposed on both sides of the main magnetic pole piece 22. Let the shortest distance between the main magnetic pole piece 22 and the side shield 23 be defined as S-Gap. Referring to FIG. 1C, the trailing shield 21 is disposed on the trailing side of the moving direction of the magnetic disk surface. Let the shortest distance between the main magnetic pole piece 22 and the trailing shield 21 be defined as T-Gap. The distance between the main magnetic pole piece 22 and each of the shield members 21, 23 means a magnetic air gap, set to control the magnetic field distribution produced from an edge of the main magnetic pole piece 22. The side shields 23 and the trailing shield 21 have been treated as separate structures in the foregoing description. These shield members may of course be formed from the same material and using the same process.

The perpendicular magnetic recording apparatus uses, together with the magnetic head 1, a recording medium including a magnetic recording layer having the axis of easy magnetization perpendicular to the film surface. FIGS. 1B and 1C also show the perpendicular magnetic recording medium (magnetic disk) 2. The magnetic disk 2 includes a perpendicular magnetic recording layer (hereinafter abbreviated to "magnetic recording layer") 41, an intermediate layer 42, and a soft magnetic underlayer 43. The soft magnetic underlayer 43 is intended to induce a perpendicular magnetic field from the magnetic head 1 to the magnetic recording layer 41 at high efficiency. The soft magnetic underlayer 43 is disposed at a position remote from the magnetic head 1 relative to the magnetic recording layer 41. The soft magnetic underlayer 43 returns a magnetic flux received from the main magnetic pole piece 22 to the auxiliary magnetic pole piece 13. The soft magnetic underlayer 43 not only induces the magnetic flux from the main magnetic pole piece 22, but also affects indirectly, for its being disposed on the underside of the magnetic recording layer 41, crystal growth of the magnetic recording layer 41 in fabricating processes of the magnetic disk 2. The intermediate layer 42 functions to control the effect of the soft magnetic underlayer 43 on the crystal growth of the magnetic recording layer 41. In order to induce a large amount of magnetic flux from the main magnetic pole piece 22, specifically, to achieve recording onto a high Hk medium offering good thermal decay characteristics, an index determining stability of fine magnetic information, it is desirable that the soft magnetic underlayer 43 have a thick film thickness. Considering the effect on crystal growth of the magnetic recording layer 41, however, an arbitrary selection of the film thickness should be avoided. Furthermore, it takes time to grow film thickness with the soft magnetic underlayer 43 having a thick film thickness. It is therefore easily understandable that film forming machines present a productivity problem.

A material of high saturation magnetic flux density, if used for the soft magnetic underlayer 43, is easier to receive the magnetic flux from the main magnetic pole piece 22. Restrictions are, however, imposed in terms of the effect on crystal growth of the magnetic recording layer 41, as in the foregoing case. Despite ongoing discussion of various kinds, the soft magnetic underlayer 43 should preferably have a saturation magnetic flux density substantially in the range from 1.3 T to 2.0 T. Film thickness may fall within a practical range from 25 nm to 100 nm.

When a magnetic domain is produced in the soft magnetic underlayer 43, a magnetic charge generated on the surface of the magnetic domain affects the read portion of the magnetic head 1, resulting in noise. To prevent this, a structured stack is effective in which a plurality of magnetic recording layers stacked one on top of another with an antiferromagnetic layer, such as Ru, interposed therebetween. A film thickness of about 0.5 nm is selected for Ru to achieve the greatest exchange coupling possible. In terms of the write element, the function of the soft magnetic underlayer is not affected by the presence of Ru. This is attributable to the fact that the element magnetic field is stronger than the exchange coupling magnetic field. During reading, Ru prevents a magnetic domain causing noise from being produced in the soft magnetic underlayer.

When magnetic information is written, the magnetic head 1 is kept in a flying state close to and above the magnetic disk 2. The magnetic recording apparatus according to first embodiment of the present invention is set to satisfy the following relationship of Lmag, T-Gap, HUS, and S-Gap:

Lmag<T-Gap and HUS<S-Gap; and

Lmag<T-Gap<HUS<S-Gap

Here, Lmag denotes the distance between the surface of the main magnetic pole piece 22 of the magnetic head 1 in the flying state and a lower surface of the magnetic recording layer 41 constituting the magnetic disk 2; HUS denotes the distance between the surface of the main magnetic pole piece 22 of the magnetic head 1 and an upper surface of the soft magnetic underlayer 43 constituting the magnetic disk 2; and LSL denotes the distance between the surface of the main magnetic pole piece 22 of the magnetic head 1 and a lower surface of the soft magnetic underlayer 43.

Calculation basis for the foregoing relationship will be described below. Conditions for the calculation are as follows. The maximum width of the main magnetic pole piece 22 is 100 nm; film thickness of the main magnetic pole piece 22, 200 nm; saturation magnetic flux density of the main magnetic pole piece 22, 2.4 T; flare point length (FP) of the main magnetic pole piece 22, 100 nm; film thickness of the soft magnetic underlayer 43 constituting the magnetic disk 2, 75 nm; film thickness of the intermediate layer 42 between the soft magnetic underlayer 43 and the magnetic recording layer 41, 26 nm; film thickness of the magnetic recording layer 41 (tmag), 18 nm; distance between the surface of the main magnetic pole piece 22 and the surface of the magnetic recording layer 41, 17.3 nm; length of the trailing shield 21 in the depth direction, 100 nm; and length of the side shield 23 in the depth direction, 100 nm. A commercially available program, MAGIC, is used for the calculation tool.

Figure 4:
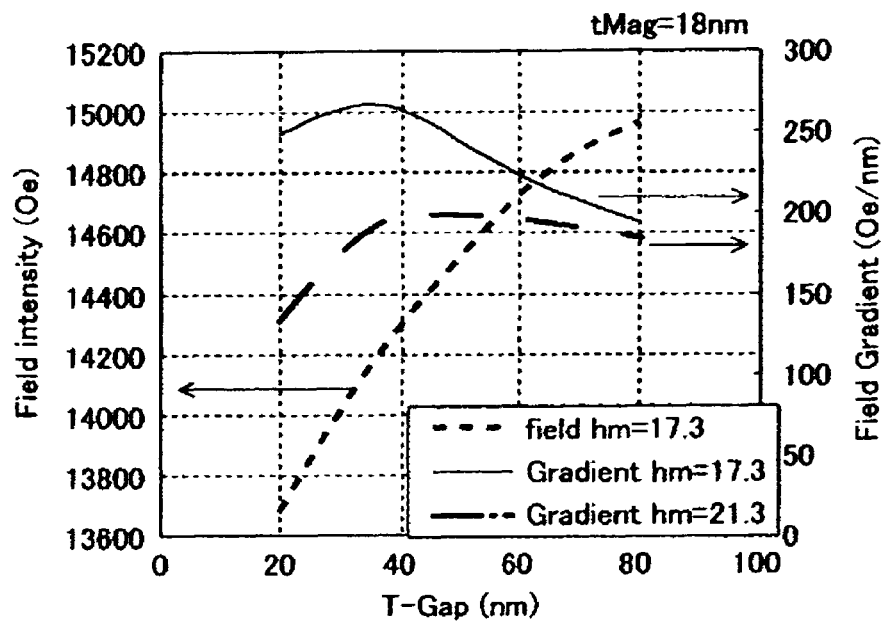
FIG. 4 is a graph showing the relationship among a trailing gap length, field intensity, and field gradient.

Under the foregoing settings, Lmag=18 nm+17.3 nm=35.3 nm. Attention is now paid to the magnetic field acting on the center of the magnetic disk 2 by varying T-Gap from 20 nm to 80 nm. FIG. 4 is a graph showing calculations when a distance hm between the surface of the main magnetic pole piece 22 and the surface of the magnetic recording layer 41 is set to 17.3 nm. In FIG. 4, the abscissa represents T-Gap, the left ordinate represents field intensity, and the right ordinate represents the maximum field gradient contributing to writing. Focusing on the calculations, it is known that the field intensity increases with wider T-Gap. It is known, however, that the field gradient at the field intensity contributing actually to the writing operation peaks at about 36 nm and is not improved even with a narrower T-Gap. It is further known that the T-Gap condition resulting in the field gradient peaking substantially coincides with Lmag=35.3 nm.

The value of hm was set to 21.3 nm for verification. Specifically, calculation was performed with Lmag=39.3 nm. The result is also shown in FIG. 4. As evident from FIG. 4, with the greater hm value, the field gradient has its peak shifted substantially to T-Gap=40 nm. Specifically, it is known in this case also that Lmag substantially coincides with the peak position of the maximum field gradient.

Figure 5:
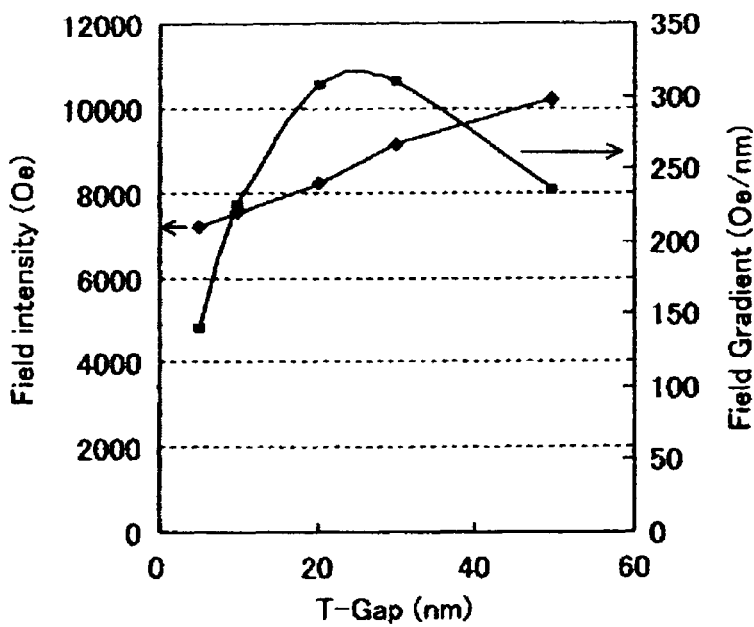
FIG. 5 is a graph showing the relationship among the trailing gap length, field intensity, and field gradient under a different condition.

To test the foregoing relationships further, calculation was also performed for conditions intended for higher densities. Conditions for the calculation are as follows. The maximum width of the main magnetic pole piece 22 is 97 nm; film thickness of the main magnetic pole piece 22, 145 nm; saturation magnetic flux density of the main magnetic pole piece 22, 2.4 T; flare point length (FP) of the main magnetic pole piece 22, 100 nm; film thickness of the soft magnetic underlayer 43 constituting the magnetic disk 2, 100 nm; film thickness of the intermediate layer 42 between the soft magnetic underlayer 43 and the magnetic recording layer 41, 12 nm; film thickness of the magnetic recording layer 41, 15 nm; distance between the surface of the main magnetic pole piece 22 and the surface of the magnetic recording layer 41, 11 nm; length of the trailing shield 21 in the depth direction, 100 nm; and length of the side shield 23 in the depth direction, 100 nm. The result is shown in FIG. 5. In this case, Lmag=11 nm+15 nm=26 nm. Focusing on the calculations, the maximum field gradient point is near about 25 nm, indicating that the peak is shifted to a narrower condition than with the Lmag value; still, the difference is small and it is considered that the optimum point is T-Gap=Lmag, at which an even greater magnetic field can be obtained.

It is well known that field gradient must be increased in order to record magnetic information at high densities. It is also well known to those skilled in the art that narrowing T-Gap improves the field gradient. It is, however, not known that the limit of T-Gap is restricted by Lmag including the film thickness of the magnetic recording layer. Consequently, it is significant to identify clearly the lower limit condition of T-Gap to achieve high density recording.

The above-referenced calculation was further developed and a new limitation on the lower limit value for S-Gap was found. The side shields 23 function to reduce magnetic fields leaking to adjacent recording tracks relative to the main magnetic pole piece 22. The S-Gap condition serves as a parameter for adjusting the amount of reduction in the magnetic field. Identifying the limit value for this parameter is therefore significant in realizing high density track recording techniques. Calculation was performed for two different S-Gap conditions of 60 nm and 140 nm with the following particulars: the maximum widths of the main magnetic pole piece 22 are 90 nm, 110 nm, and 130 nm; film thickness of the main magnetic pole piece 22, 200 nm; saturation magnetic flux density of the main magnetic pole piece 22, 2.4 T; flare length of the main magnetic pole piece 22, 100 nm; the film thickness of the soft magnetic underlayer 43 constituting the magnetic disk 2, 75 nm; film thickness of the intermediate layer 42 between the soft magnetic underlayer 43 and the magnetic recording layer 41, 26 nm; film thickness of the magnetic recording layer 41, 18 nm; distance between the surface of the main magnetic pole piece 22 and the surface of the magnetic recording layer 41, 17.3 nm; length of the trailing shield 21 in the depth direction, 100 nm; and length of the side shield 23 in the depth direction, 100 nm.

Figure 6:
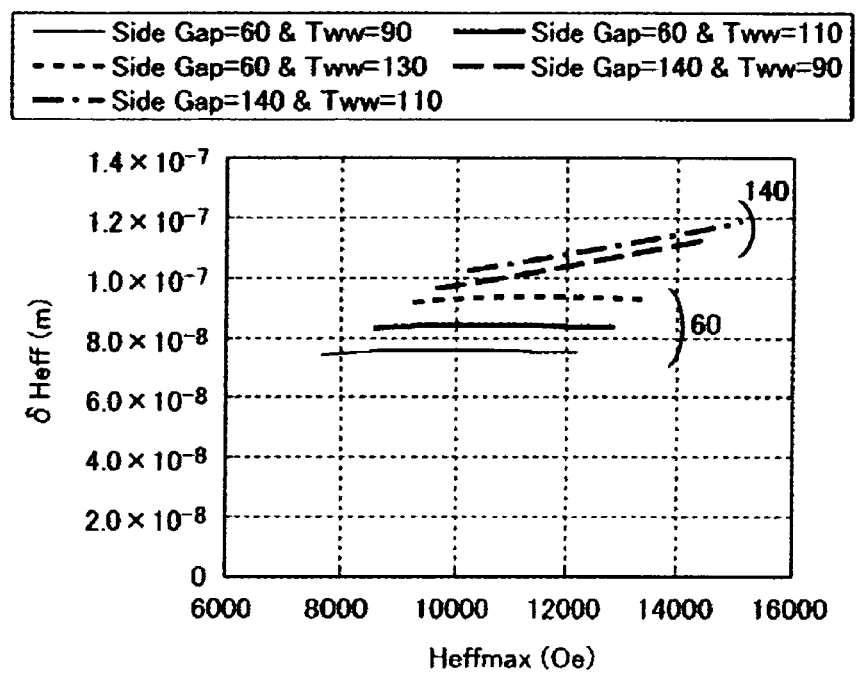
FIG. 6 is a graph showing the relationship between a side gap length and a magnetic field range.

FIG. 6 is a graph showing calculations. In FIG. 6, the abscissa represents intensity (Heffmax) of the magnetic field generated (recording magnetic field) and the ordinate represents range (distance) (δ Heff) affected by the recording magnetic field. Defined for the affected range is a range, over which a magnetic field of $1/2.6$ of the maximum recording magnetic field affects. The affected range is thus defined in order to normalize spread of the head magnetic field. This technique is effective in comparing high density recording performance under environment of different recording magnetic field intensities. Studying the calculations reveals that, for S-Gap=60 nm, the amount of spread of the recording magnetic field relative to the recording magnetic field intensity remains substantially constant in any of the different values of width of the main magnetic pole piece 22. For S-Gap=140 nm, on the other hand, the amount of spread of the recording magnetic field becomes pronounced with the increase in the recording magnetic field intensity. A rate, at which the magnetic field spreads relative to the head magnetic field, is calculated as about $2.8 \times 10^{-12}$ m/Oe.

It is known that the recording magnetic field intensity varies with recording current and the flare length of the main magnetic pole piece. It is well known that forming the width of the main magnetic pole piece to close tolerances does not necessarily allow a magnetic width to be set at a constant value. The magnetic width can be made constant if a distribution range of the recording magnetic field can be reduced. Accordingly, it is estimated that the conditions of S-Gap=60 nm obtained through the current calculation make constant the magnetic recording track width with changes in the recording magnetic field.

Conditions were set for the current calculation as follows: hm=17.3 nm; film thickness of the magnetic recording layer 41 is 18 nm; and film thickness of the intermediate layer 42 between the soft magnetic underlayer 43 and the magnetic recording layer 41 is 26 nm. That is, HUS=61.3 nm. It is then known that the conditions of S-Gap=60 nm are substantially equal to this HUS. It is estimated that spread of the head magnetic field can be similarly restricted under ferromagnetic field conditions with S-Gap made narrower than 60 nm. The narrower the S-Gap value, however, the more the amount of magnetic flux leaking from the main magnetic pole piece 22 to the side shields 23, resulting in a substantially reduced recording magnetic field. The condition disclosed through the current calculation is within about 1 kOe for S-Gap=140 nm under identical main magnetic pole piece width condition, which presents no practical application problems. Accordingly, for S-Gap conditions, setting the minimum width to HUS makes constant the spread width of the head magnetic field, thus allowing the field intensity to be maintained at a high level. Since S-Gap conditions set by HUS have not been disclosed, the current calculation is significant.

Figure 7:
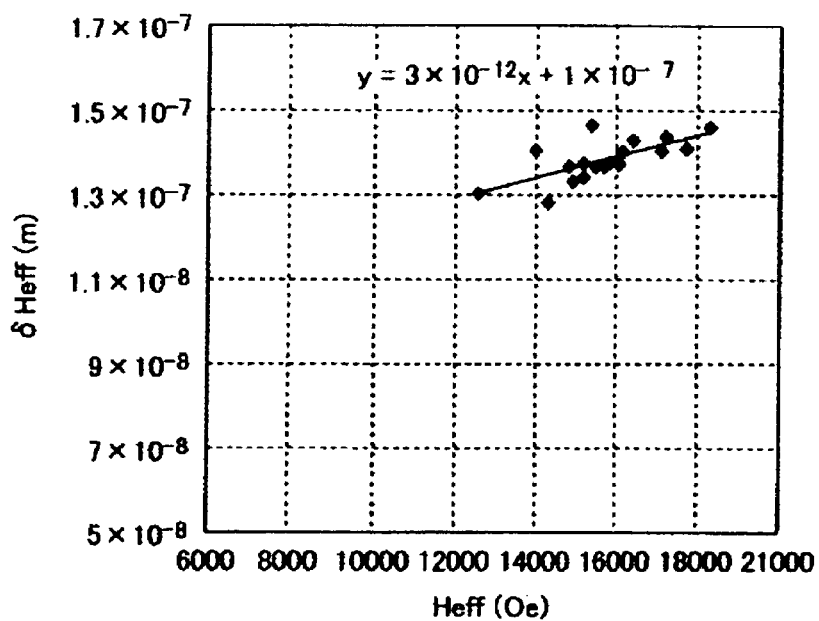
FIG. 7 is a graph showing the magnetic field range under an infinite length side gap condition.

The upper limit of S-Gap will next be examined. FIG. 7 is a graph showing calculations for S-Gap being infinity, specifically, in the case where the side shields 23 are excluded. The trailing shield 21 is left unchanged in the above-referenced condition. The calculations include those for various track widths (90 to 140 nm) and T-Gap conditions (30 to 80 nm). As evident from FIG. 7, the greater the head magnetic field intensity, the wider the head magnetic field spreads. The spread has a gradient of about $3 \times 10^{-12}$ m/Oe, which substantially coincides with the gradient in the case of S-Gap=140 nm. It is therefore safe to assume that the benefit of suppressing the spread of the head magnetic field has its upper limit substantially at S-Gap=140 nm and any wider S-Gap remains the same as with S-Gap=infinity.

Figure 8:
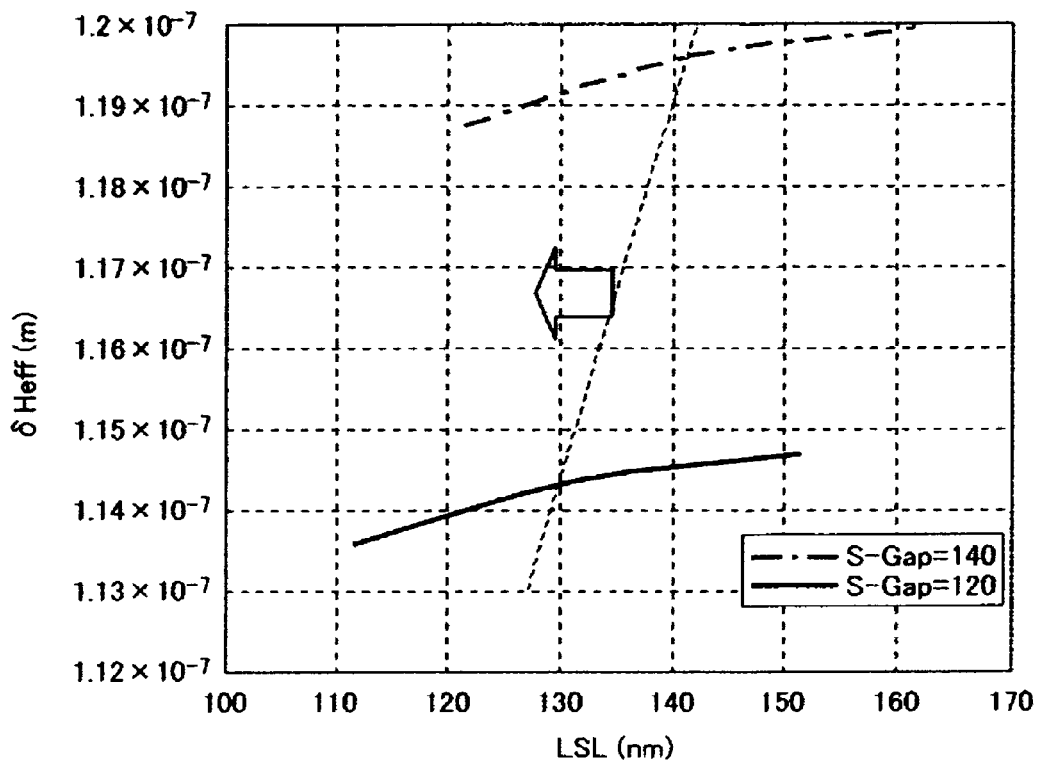
FIG. 8 is a graph showing the relationship between an LSL condition and the magnetic field range.

Reasons why the benefit of suppressing the spread of the head magnetic field has its upper limit at S-Gap=140 nm will be next discussed FIG. 8 is a graph showing calculations obtained by changing the distance LSL up to the lower surface of the soft magnetic underlayer 43 of the magnetic disk 2 by varying the film thickness of the soft magnetic underlayer 43. In FIG. 8, the abscissa represents LSL and the ordinate represents the same head magnetic field spread width (δ Heff). From FIG. 8, it is known that the change in the head magnetic field spread width relative to LSL diminishes starting with the condition of LSL becoming 140, which is substantially equal to S-Gap. The phenomenon of the diminishing change in the head magnetic field spread width means lessening of the effect of the side shields 23. This leads to a conclusion that the LSL range is 140 nm or more, within which the effect of S-Gap=140 nm can be obtained.

The above-referenced tendency was checked also with S-Gap=120 nm. FIG. 8 also shows results of this check. A close look at the results reveals that there is a change in the tendency of the head magnetic field spread width starting with the condition of LSL=130 nm. Specifically, the effect of the side shields 23 can be obtained under the conditions of S-Gap=120 nm and LSL=130 nm or less.

Though only the foregoing two conditions were checked, it is safe to conclude that the effect of the side shields 23 can be obtained by satisfying S-Gap<LSL (the broken line in FIG. 8 connects the two points of change) in either case of calculation.

As described heretofore, in accordance with the first embodiment of the present invention, it is clarified that high linear density recording can be achieved by specifying the range of trailing gap (T-Gap) with the medium condition (Lmag). It is also clarified that high track density performance can be achieved by specifying, using the condition of the soft magnetic underlayer of the magnetic disk, the side gap (S-Gap) condition corresponding to the distance between the main magnetic pole piece and the shield disposed on the side of the main magnetic pole piece. It is further clarified that areal recording density, which is the most important in making a magnetic disk, can be improved by satisfying Lmag<T-Gap<HUS<S-Gap.

Second Embodiment

Figure 9:
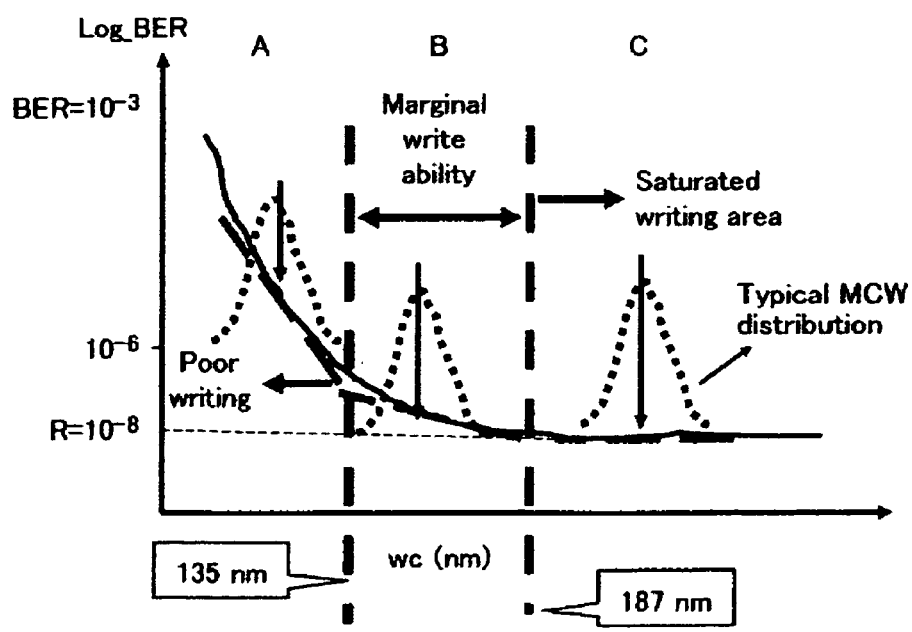
FIG. 9 is a graph showing the relationship between a magnetic track width and an error rate in an experimental head.

A magnetic disk drive according to a second embodiment of the present invention will be described with reference to FIGS. 9 and 10. FIG. 9 is a graph showing measurements taken of a magnetic track width WC of a magnetic head actually made and an error rate BER obtained by actually writing and reading magnetic information. The magnetic recording track width WC is defined as a half-value width of an amplitude distribution of an output signal obtained by letting the magnetic head seek in a track width direction through magnetic information recorded on a magnetic disk at any given fixed frequency by the magnetic head. The magnetic head has the same specifications as the magnetic head 1 of the magnetic disk drive 10 according to the first embodiment of the present invention. Specifically: the maximum width of the main magnetic pole piece is 100 nm; film thickness of the main magnetic pole piece, 200 nm; saturation magnetic flux density of the main magnetic pole piece is 2.4 T; flare length of the main magnetic pole piece, 100 nm; film thickness of the soft magnetic underlayer constituting the magnetic disk, 75 nm; film thickness of the intermediate layer between the soft magnetic underlayer and the magnetic recording layer, 26 nm; film thickness of the magnetic recording layer, 18 nm; distance between the surface of the main magnetic pole piece and the surface of the magnetic recording layer, 17.3 nm; length of the trailing shield in the depth direction, 100 nm; and length of the side shield in the depth direction, 100 nm. The magnetic disk has the same specifications as the magnetic disk 2 of the magnetic disk drive 10 according to the first embodiment of the present invention. The magnetic recording layer has a coercivity of about 4 kOe (320 kA/m) and Hk of 16 kOe (1280 kA/m). The foregoing specifications represent median values. It is well known that actual fabrication of heads involves part-to-part variations in dimensions, film thickness, interlayer registration, and other parameters. FIG. 9 shows a curve drawn by plotting centers of dispersion occurring from these process variations.

Studying closely the plotted curve reveals following. Specifically, the magnetic track width widens with an improved error rate as the head magnetic field becomes more intense. With a less intense head magnetic field, conversely, the magnetic track width narrows with a reduced error rate. It should, however, be noted that there is a substantial reduction in the error rate on a low magnetic field side as compared with a high magnetic field side, the curve being L-shaped as evident from FIG. 9.

It is possible to reduce tolerances by optimizing process conditions during fabrication of the device and introducing generally expensive high precision fabrication equipment. Think of three types of narrow normal distribution having boundaries at 135 nm and 187 nm: normal distribution A with a narrow magnetic width and low error rates; normal distribution B with a magnetic width falling within the range between 135 nm and 187 nm and the error rate distributed in an area near saturation; and normal distribution C with the widest magnetic width of these three and the best error rate distribution.

In making a magnetic disk drive, the magnetic head must have an error rate of the level of $10^{-6}$ on a predetermined magnetic recording medium. This makes it necessary for the magnetic head of normal distribution A to be used under a condition of reduced linear recording density. The magnetic head of normal distribution A has an advantage of achieving high track density recording for its narrow track width. The magnetic head of normal distribution C, though achieving a sufficient error rate (of the level of $10^{-8}$), is unable to increase the track density. It is further expected that the magnetic head of normal distribution B offers performance in-between.

Figure 10:
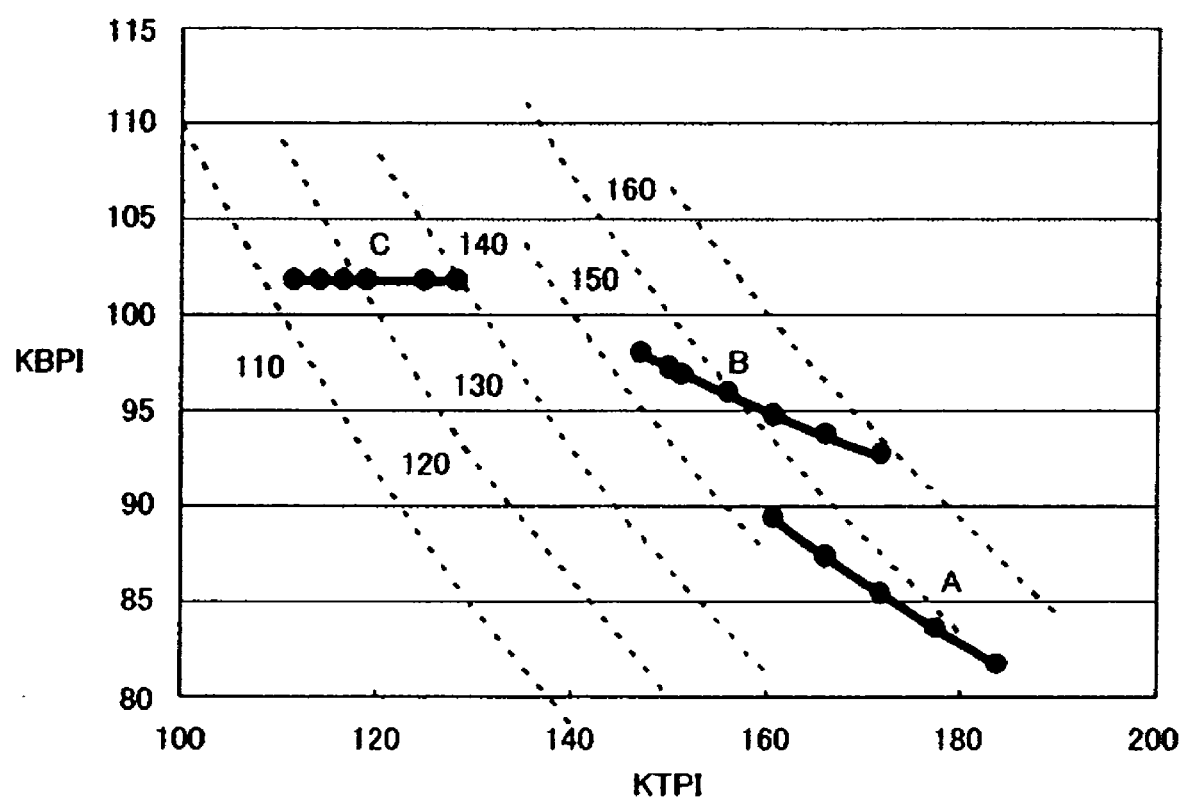
FIG. 10 is a graph showing the relationship among linear recording density, track density, and an achieved surface recording density in the experimental head.

FIG. 10 is a graph showing calculations of the surface recording density (linear density (kBPI)×track density (kTPI)) obtained from a magnetic disk drive configured using these three types of distribution. The graph shows quantitatively the recording density to be achieved by the head of each distribution. Specifically, the head of distribution A can be used in a high track density condition of 170 kTPI, though offering only a low linear density of about 85 kBPI. The head of distribution C, on the other hand, is capable of achieving a high linear density of about 100 kBPI, though offering a low track density of 120 kTPI at most. Situated in-between the foregoing two types, the head of distribution B features only small degradation in terms of both linear and track densities. This is because the above-described changes in the magnetic track width and the error rate are substantially L-shaped and distribution B includes an inflection point thereof (that is, exhibiting saturation performance both for the abscissa and the ordinate). As a result, distribution B is distributed in a region having the highest contour line of achieved surface recording density shown by broken lines.

It is clear experimentally that the inflection point of the L-shaped distribution moves laterally by a geometric track width. Further, the magnetic track width is widened by about 40 to 50 nm relative to the geometric track width. The width widened can be explained by a difference between the dynamic coercivity of the magnetic disk and the saturation recording magnetic field. Theoretically, a magnetic disk having a precipitous inclination of an M-H loop has a narrower widened width than one having a mild inclination of the M-H loop.

The relationship between the geometric track width (maximum width of the main magnetic pole piece) and the above-referenced inflection point is determined when the specifications for the magnetic disk are fixed. The distribution range moves vertically and horizontally according to head fabrication tolerances (change in field intensity—change in geometric width). Presence of the inflection point from a small distribution range can be verified by using an amount of change in the error rate relative to recording current conditions dBER and an amount of change in the magnetic track width dWC, regardless of the type of recording media. According to an experiment made by the inventors, the highest recording density could be achieved by configuring a magnetic disk drive using a magnetic disk with a range (range of inclination at a median point of distribution B) of 0.25 to 0.45 per dWC=10 nm. As described earlier, the change in the magnetic track width takes into account head-to-head variations. It has, however, been confirmed that, even with a single head, the variations can be developed to other recording conditions, such as amplitude of a recording current and an overshoot of the recording current. The reason for this is that the recording performance (generated magnetic field) of the magnetic head depends mainly on the flare length. As described earlier, the L-shaped distribution is attributable to fabrication variations; however, it is safe to assume that the main cause is variations in the flare length and therefore the change induced in the recording magnetic field. Accordingly, the same tendency as in the change in flare length can be observed even in changing the recording conditions of the magnetic head (changing the recording magnetic field).

Measurements were taken of the foregoing phenomenon for various types of media and under different head conditions. It has then been confirmed that the range is widely applicable to perpendicular magnetic recording (footprint recording of the main magnetic pole piece shape).

Control of high linear density performance and magnetic track width is the most important in configuring the magnetic disk drive. In the first embodiment of the present invention, it is clarified that high linear density recording can be achieved by specifying the trailing gap range with the medium conditions. It is also clarified that high track density performance can be achieved by specifying the side gap condition, which corresponds to the distance between the main magnetic pole piece and the shield disposed on the side thereof, using the soft magnetic underlayer of the recording medium. An application of the first embodiment prevents the magnetic width from substantially widening relative to the geometric width of the main magnetic pole piece. This effect prevents distribution from expanding into a region corresponding to the above-mentioned distribution C.

Expansion of the abovementioned distribution A should be basically made through control of the geometric width and flare length of the main magnetic pole piece. If it is not practical to use expensive fabricating equipment for the need of making magnetic heads at low cost, the magnetic width can be adjusted using the recording current. As described earlier, in perpendicular magnetic recording, the footprint of the main magnetic pole piece is recorded on the medium. In a structure having side shields for restricting the recording width, therefore, any discrepancies in the geometric width can be compensated by increasing the recording current.

Specifically, current amplitude is adjusted in proportion to FP/Wp obtained from a geometric track width Wp and the flare length FP. A longer flare length FP results in a decreased field intensity. A strong recording current is therefore applied to compensate for the decreased field intensity. Similarly, a strong recording current is applied to compensate for a narrow geometric width. According to an experiment conducted by the inventors using a medium, the sensitivity induced by the flare length FP to the head magnetic field was the highest, which was followed by the sensitivity of the geometric track width Wp. Accordingly, the control of the head magnetic field using the recording current adjusted with different FP/Wp conditions offered good reproducibility, allowing the head magnetic field, that is, performance to be held within the range of distribution B.

It is considered that the abovementioned relationship is varied under different types of recording media. It has, however, been verified that the sensitivity of FP and Wp is substantially linear if the head exists in the region permitting the abovementioned adjustments (distribution in region A close to region B). It is thus known that the adjustment permits control of the magnetic track width.

As described heretofore, in accordance with the second embodiment of the present invention, high recording linear density and high recording track density can be achieved. This effect allows the intended high density recording magnetic disk drive to be obtained.

What is claimed is:

1. A magnetic recording apparatus comprising:
a perpendicular magnetic recording medium having a soft magnetic underlayer and a magnetic recording layer disposed on a substrate; and
a magnetic head including:
a main magnetic pole piece;
a trailing shield disposed on a trailing side of the main magnetic pole piece;
side shields disposed on a trailing side of the main magnetic pole piece;
an auxiliary magnetic pole piece; and
a coil generating a magnetic flux in the main magnetic pole piece;
wherein Lmag<T-Gap and HUS<S-Gap are satisfied where the magnetic shortest air gap between the main magnetic pole piece and the trailing shield is defined as T-Gap; the magnetic shortest air gap between the main magnetic pole piece and the side shield is defined as S-Gap; a distance between a surface of the main magnetic pole piece and a lower surface of the magnetic recording layer during a write operation is defined as Lmag; and a distance between the surface of the main magnetic pole piece and an upper surface of the soft magnetic underlayer during the write operation is defined as HUS.

2. The magnetic recording apparatus according to claim 1, wherein S-Gap<LSL is satisfied where a distance between the surface of the main magnetic pole piece and a lower surface of the soft magnetic underlayer is defined as LSL.

3. The magnetic recording apparatus according claim 1, wherein Lmag<T-Gap<HUS<S-Gap is satisfied.

4. The magnetic recording apparatus according to claim 3, wherein S-Gap<LSL is satisfied where the distance between the surface of the main magnetic pole piece and the lower surface of the soft magnetic underlayer is defined as LSL.

5. A magnetic recording apparatus comprising:
a perpendicular magnetic recording medium having a soft magnetic underlayer and a magnetic recording layer disposed on a substrate; and
a magnetic head including:
a main magnetic pole piece;
a trailing shield disposed on a trailing side of the main magnetic pole piece;
side shields disposed on both sides of the main magnetic pole piece;
an auxiliary magnetic pole piece; and
a coil generating a magnetic flux in the main magnetic pole piece;
wherein, in a relationship between a magnetic recording track width WC defined from a half-value width of an amplitude distribution of an output signal obtained by letting the magnetic head seek, along a track width direction, magnetic information recorded on the perpendicular magnetic recording medium at any given fixed frequency by the magnetic head and an error rate BER obtained by writing and reading magnetic information, a change width of dBER/dWC falls within a range of inclination of 0.25 to 0.45 per dWC=10 nm, where an amount of change in the magnetic track width is defined as dWC and an amount of change in the error rate relative to a condition of a recording current supplied to the coil is defined as dBER.

6. The magnetic recording apparatus according to claim 5, wherein Lmag<T-Gap and HUS<S-Gap are satisfied where the magnetic shortest air gap between the main magnetic pole piece and the trailing shield is defined as T-Gap; the magnetic shortest air gap between the main magnetic pole piece and the side shield is defined as S-Gap; a distance between a surface of the main magnetic pole piece and a lower surface of the magnetic recording layer during a write operation is defined as Lmag; and a distance between the surface of the main magnetic pole piece and an upper surface of the soft magnetic underlayer during the write operation is defined as HUS.

7. The magnetic recording apparatus according to claim 6, wherein S-Gap<LSL is satisfied where a distance between the surface of the main magnetic pole piece and a lower surface of the soft magnetic underlayer during a write operation is defined as LSL.

8. The magnetic recording apparatus according to claim 5, wherein Lmag<T-Gap<HUS<S-Gap is satisfied.

9. The magnetic recording apparatus according to claim 8, wherein S-Gap<LSL is satisfied where the distance between the surface of the main magnetic pole piece and the lower surface of the soft magnetic underlayer during the write operation is defined as LSL.

10. The magnetic recording apparatus according to claim 5, wherein the change width of dBER/dWC falls within the range of inclination of 0.25 to 0.45 per dWC=10 nm by adjusting an amplitude of the recording current in proportion to FP/Wp, where a geometric track width exposed to an air bearing surface of the main magnetic pole piece is defined as Wp and a length in a depth direction is defined as FP.

* * * * *

UNITED STATES PATENT AND TRADEMARK OFFICE
CERTIFICATE OF CORRECTION

PATENT NO. : 7,920,359 B2
APPLICATION NO. : 12/012241
DATED : April 5, 2011
INVENTOR(S) : Maruyama et al.

It is certified that error appears in the above-identified patent and that said Letters Patent is hereby corrected as shown below:

Col 13, line 39, change "side shields disposed on a trailing side of the main" to --side shields disposed on both sides of the main--.

Col 13, line 61, change "apparatus according claim 1" to --apparatus according to claim 1--.

Signed and Sealed this
Twenty-eighth Day of June, 2011

David J. Kappos
*Director of the United States Patent and Trademark Office*